United States Patent
Ju et al.

(10) Patent No.: US 10,067,286 B2
(45) Date of Patent: Sep. 4, 2018

(54) LAMP DEVICE

(71) Applicant: Radiant Opto-Electronics Corporation, Kaohsiung (TW)

(72) Inventors: Chih-Hung Ju, Kaohsiung (TW); Guo-Hao Huang, Kaohsiung (TW); Kun-Feng Chen, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 483 days.

(21) Appl. No.: 14/876,523

(22) Filed: Oct. 6, 2015

(65) Prior Publication Data
US 2016/0147009 A1    May 26, 2016

(30) Foreign Application Priority Data
Nov. 20, 2014 (TW) .............................. 103140223 A

(51) Int. Cl.
*F21V 7/04* (2006.01)
*F21V 8/00* (2006.01)

(52) U.S. Cl.
CPC ........... *G02B 6/0091* (2013.01); *G02B 6/009* (2013.01); *G02B 6/0068* (2013.01); *G02B 6/0085* (2013.01); *G02B 6/0031* (2013.01); *G02B 6/0088* (2013.01)

(58) Field of Classification Search
CPC .. G02B 6/0091; G02B 6/0068; G02B 6/0085; G02B 6/009
USPC ........................................................ 362/613
See application file for complete search history.

(56) References Cited

U.S. PATENT DOCUMENTS

| | | | | |
|---|---|---|---|---|
| 6,095,669 A | * | 8/2000 | Cho | F21S 8/026 362/147 |
| 7,607,812 B2 | * | 10/2009 | Kim | F21S 8/033 362/602 |
| 2006/0262521 A1 | * | 11/2006 | Piepgras | E04B 9/006 362/149 |
| 2010/0226125 A1 | * | 9/2010 | Liao | F21V 19/004 362/235 |
| 2011/0116015 A1 | * | 5/2011 | Yakura | G02B 6/0091 349/67 |
| 2011/0310327 A1 | | 12/2011 | He | |
| 2012/0242929 A1 | * | 9/2012 | Ohyama | G02B 6/0068 349/61 |

(Continued)

FOREIGN PATENT DOCUMENTS

| CN | 101482240 A | 7/2009 |
|---|---|---|
| CN | 201696950 U | 1/2011 |

(Continued)

*Primary Examiner* — Bryon T Gyllstrom
(74) *Attorney, Agent, or Firm* — Perkins Coie LLP

(57) ABSTRACT

A lamp device includes a heat dissipating seat, a light emitting unit, a mounting seat and a light guide plate. The heat dissipating seat defines an accommodation space with an opening. The light emitting unit is fixed to the heat dissipating seat within the accommodation space. The mounting seat is disposed in the accommodation space through the opening, and covers the light emitting unit. A receiving space is defined by at least a portion of the mounting seat and extends in a direction away from the light emitting unit. The light guide plate has at least a portion inserted into and fixed within the receiving space.

23 Claims, 12 Drawing Sheets

(56) References Cited

U.S. PATENT DOCUMENTS

| | | | |
|---|---|---|---|
| 2012/0287666 A1* | 11/2012 | Kwon | G02F 1/133615 362/602 |
| 2012/0294032 A1* | 11/2012 | Chen | G02B 6/0085 362/606 |
| 2013/0027635 A1 | 1/2013 | Urano et al. | |
| 2013/0120995 A1* | 5/2013 | Sato | F21V 21/088 362/249.02 |
| 2014/0009962 A1* | 1/2014 | Kang | G02B 6/0011 362/612 |
| 2014/0016352 A1 | 1/2014 | He | |
| 2014/0063847 A1* | 3/2014 | Sakamoto | G02B 6/0031 362/609 |

FOREIGN PATENT DOCUMENTS

| | | |
|---|---|---|
| CN | 202182401 U | 4/2012 |
| CN | 202188376 U | 4/2012 |
| CN | 103672573 A | 3/2014 |
| TW | 201102717 A1 | 1/2011 |
| TW | 201144674 A1 | 12/2011 |

* cited by examiner

LAMP DEVICE

CROSS-REFERENCE TO RELATED APPLICATION

This application claims priority of Taiwanese Application No. 103140223, filed on Nov. 20, 2014.

FIELD

The disclosure relates to a lighting tool, and more particularly to a lamp device that is easy to assemble.

BACKGROUND

As shown in FIG. 1, a conventional light-emitting diode (LED) lamp device 1 includes a heat dissipating seat 11 defining an accommodation space 10, a light emitting unit 12 accommodated in the accommodation space 10, a light guide plate 13 accommodated in the accommodation space 10 spaced apart from the light emitting unit 12, a reflecting unit 14 disposed in the accommodation space 10 and matching in position with the light guide plate 13, and a fixing unit 15 disposed in the accommodation space 10 for fixing the light guide plate 13.

The heat dissipating seat 11 includes first and second assembly members 111, 112 that are joined together and that cooperate with each other to divide the accommodation space 10 into a first mounting area 101 for receiving the light emitting unit 12, and a second mounting area 102 spaced apart from the first mounting area 101 for receiving the light guide plate 13 therethrough. The lightguide plate 13 is sandwiched between the first and second assembly members 111, 112, and divides the second mounting area 102 into two filling portions 103, each of which is defined between the light guide plate 13 and a corresponding one of the first and second assembly members 111, 112. The light emitting unit 12 includes a circuit board 121 fixed to the first assembly member 111 within the first mounting area 101, and at least one light-emitting diode 122 fixed to the circuit board 121. The reflecting unit 14 includes two reflecting pieces 141 respectively mounted in the filling portions 103. The fixing unit 15 includes a fixing member 151 disposed in the second mounting area 102 and penetrates the light guide plate 13, and two fillers 152 respectively disposed in the remaining spaces of the filling portions 103 below the reflecting pieces 141.

During assembly of the conventional LED lamp device 1, the light emitting unit 12 is first fixed to the first assembly member 111 of the heat dissipating seat 11 by using an adhesive or a fastener. The light guide plate 13, the reflecting pieces 141 and the fillers 152 are then disposed in their corresponding specific locations, followed by mutual engagement of the first and second assembly members 111, 112, thereby completing the assembly process. However, since the conventional LED lamp device 1 has many components, and since the assembly of the components thereof is complicated and must rely on experience and proficiency for quick assembly, the cost of the conventional LED lamp device 1 is high, and the assembly process thereof is time-consuming and prone to failure.

SUMMARY

Therefore, an object of the disclosure is to provide a lamp device that can alleviate at least one of the drawbacks of the prior art.

According to an aspect of the disclosure, a lamp device includes a heat dissipating seat, a light emitting unit, a mounting seat, a receiving space and a light guide plate. The heat dissipating seat defines an accommodation space with an opening. The light emitting unit is fixed to the head dissipating seat within the accommodation space. The mounting seat is disposed in the accommodation space through the opening and covers the light emitting unit. The receiving space is defined by at least a portion of the mounting seat and extends in a direction away from the light emitting unit. The light guide plate has at least a portion inserted into and fixed within the receiving space.

According to another aspect of the disclosure, a lamp device includes a mounting seat, a light guide plate and a light emitting unit. The mounting seat includes a base plate, and two spaced-apart extending plates extending from the base plate along the same direction and cooperating with the base plate to define a receiving space. The base plate has at least one through slot. The light guide plate has at least a portion inserted into and fixed within the receiving space. The light emitting unit includes at least one light source. Light emitted from the at least one light source enters the receiving space through the at least one through slot and emits out through the light guide plate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
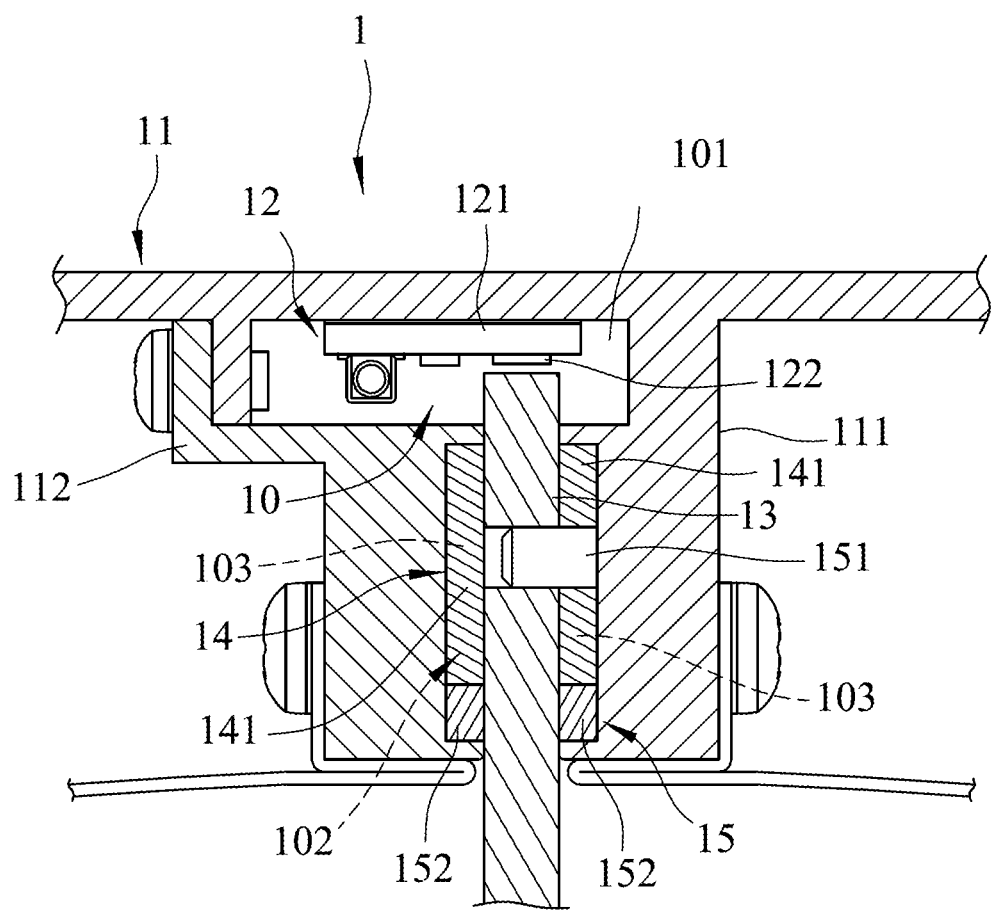
FIG. 1 is a fragmentary cross-sectional view illustrating a conventional LED lamp device.

Before the disclosure is described in greater detail, it should be noted that like elements are denoted by the same reference numerals throughout the disclosure.

Figure 2:
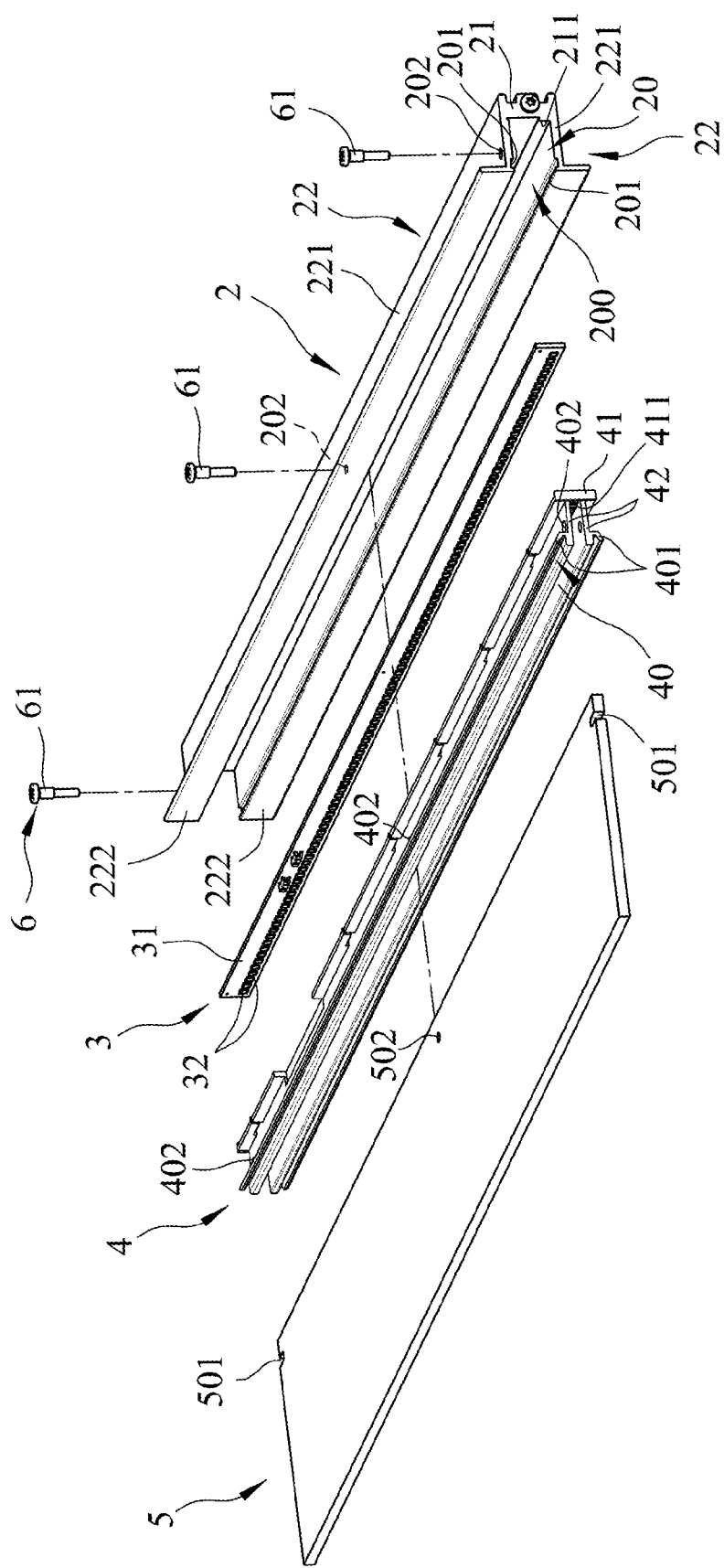
FIG. 2 is an exploded perspective view illustrating a first embodiment of a lamp device according to the disclosure.
Figure 3:
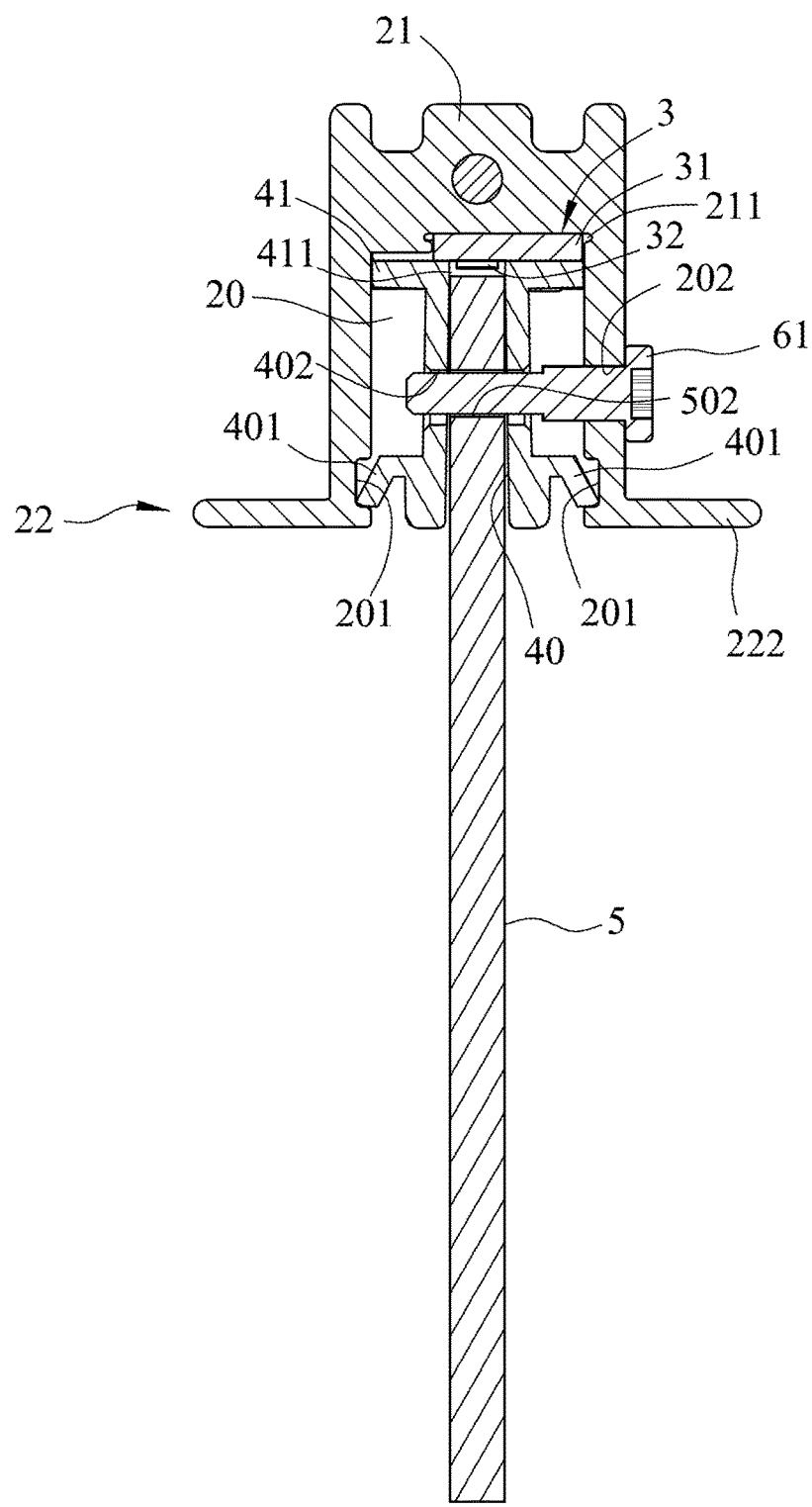
FIG. 3 is a cross-sectional view of the first embodiment in an assembled state.
Figure 4:
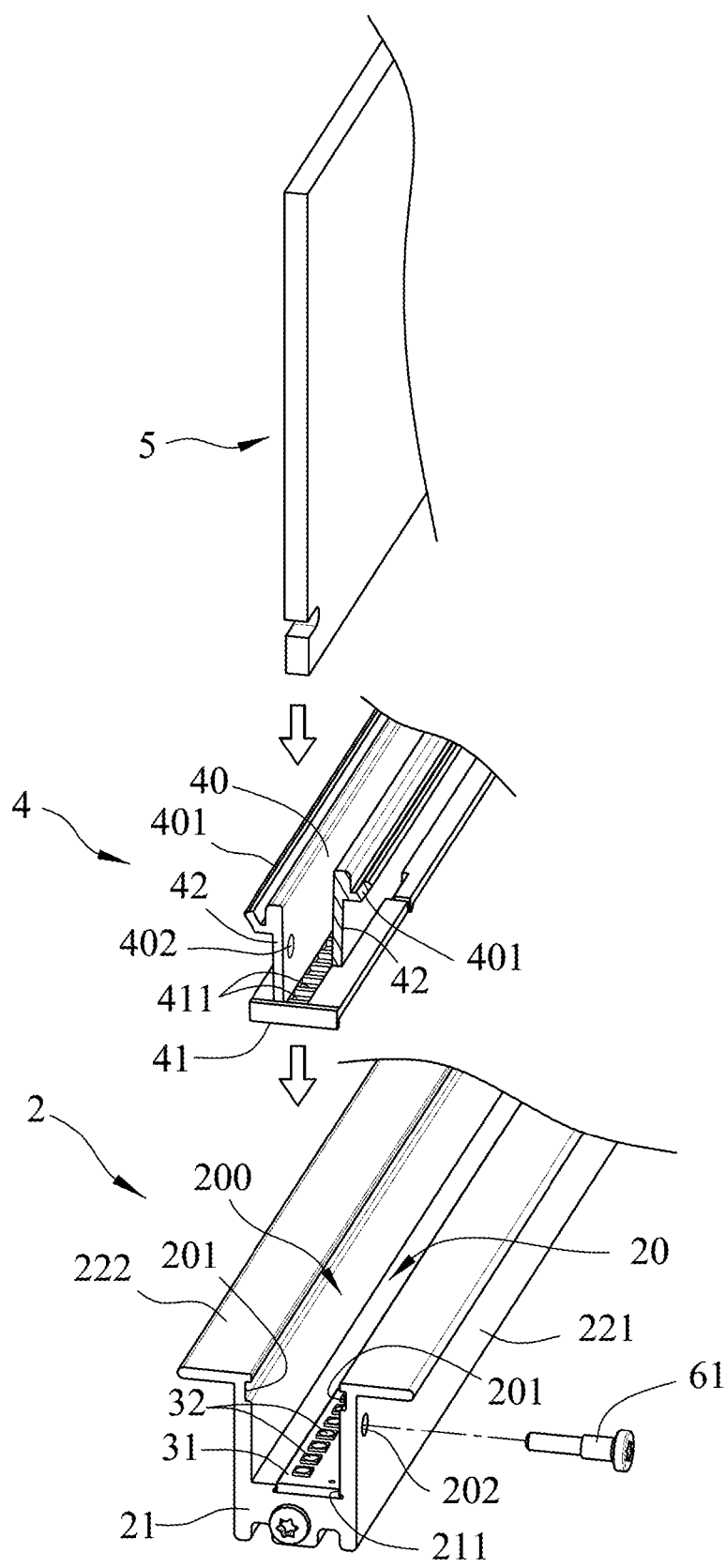
FIG. 4 is a fragmentary exploded perspective view of the first embodiment, illustrating how a heat dissipating seat, a mounting seat combined with a light emitting unit, and a light guide plate of the first embodiment are assembled.
Figure 5:
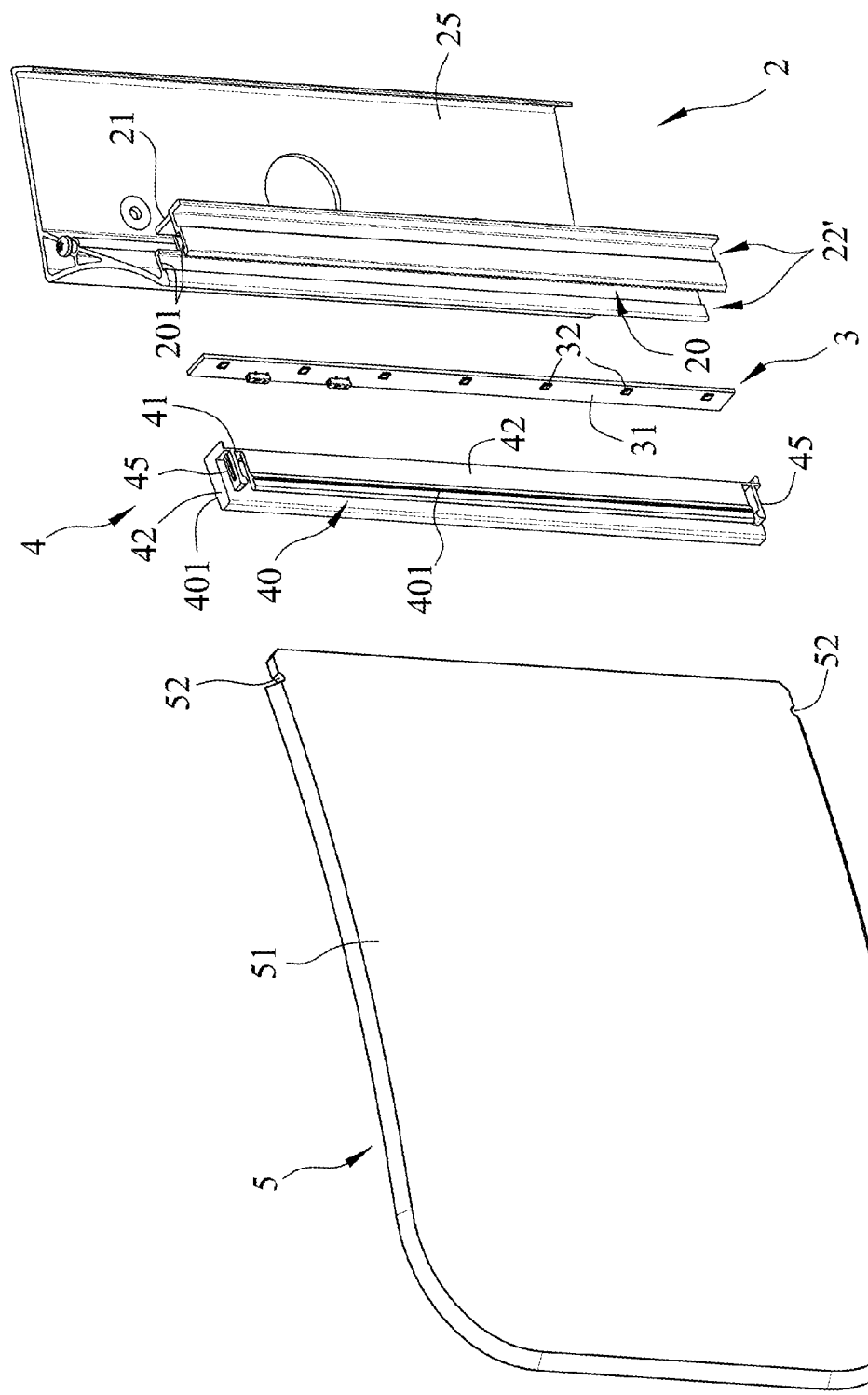
FIG. 5 is an exploded perspective view illustrating a second embodiment of the lamp device according to the disclosure.
Figure 6:
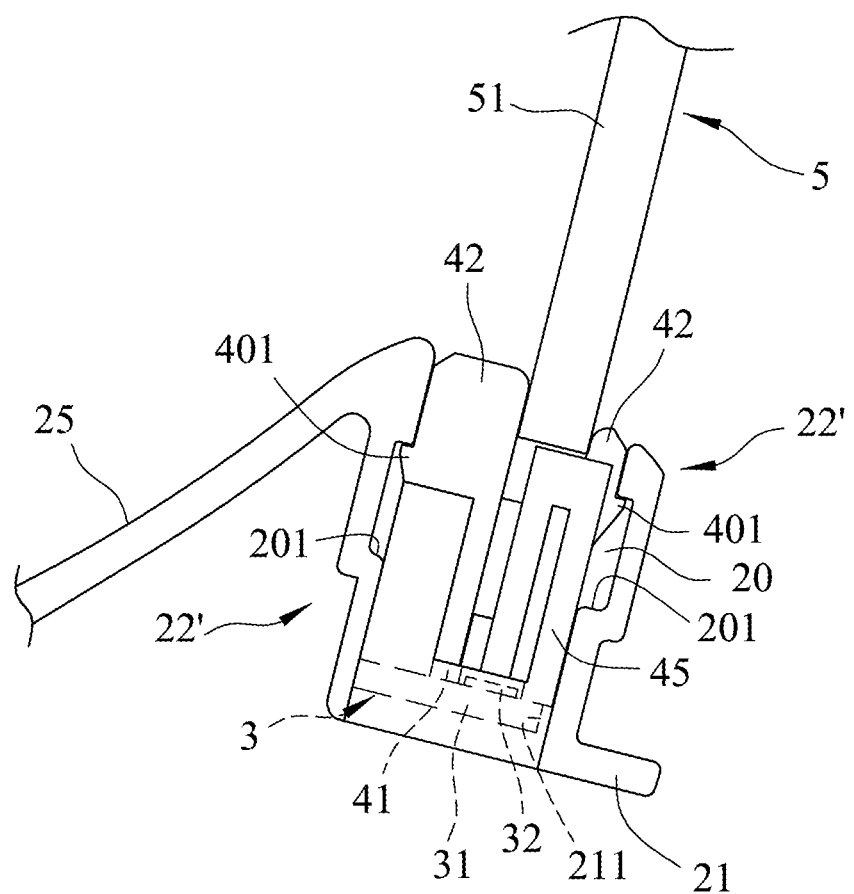
FIG. 6 is a fragmentary schematic side view of the second embodiment in an assembled state.

Referring to FIGS. 2 to 4, the first embodiment of a lamp device according to the disclosure includes a heat dissipating seat 2, a light emitting unit 3, a mounting seat 4, a light guide plate 5, and a fixing unit 6 to assist in the assembly of the lamp device. The heat dissipating seat 2 defines an accommodation space 20 with an opening 200. The light emitting unit 3 is fixed to the heat dissipating seat 2 within the accommodation space 20. The mounting seat 4 is disposed in the accommodation space 20 through the opening 200, and covers the light emitting unit 3. The mounting seat 4 defines a receiving space 40 that is opposite to the light emitting unit 3. The light guide plate 5 has a portion inserted into and fixed within the receiving space 40. The fixing unit 6 includes a plurality of fixing members 61, such as screws or bolts, for fixing the portion of the light guide plate 5 within the receiving space 40.

The light guide plate 5 is substantially rectangular, and has two concave grooves 501 extending inwardly and respectively from two opposite short sides thereof, and an orifice 502 is configured between the concave grooves 501. The concave grooves 501 and the orifice 502 are provided for the fixing members 61 to pass respectively therethrough. It should be noted herein that the light guide plate 5 may be formed with a plurality of orifices 502, so that more fixing members 61 may be used to fix the light guide plate 5 in the receiving space 40.

The heat dissipating seat 2 includes a base plate 21, and two lateral members 22 respectively connected to two opposite ends of the base plate 21 and cooperating with the base plate 21 to define the accommodation space 20. Each of the lateral members 22 includes a lateral plate portion 221 connected to a respective one of the two opposite ends of the base plate 21, and a wing plate portion 222 extending transversely from one end of the lateral plate portion 221 opposite to the base plate 21 in a direction away from the other lateral member 22. The base plate 21 is provided with a receiving groove 211 for receiving the light emitting unit 3. The heat dissipating seat 2 has two first engaging portions 201 facing each other and the accommodation space 20, and a plurality of spaced-apart through holes 202 for the fixing members 61 to pass respectively therethrough. The first engaging portions 201 are respectively formed on the lateral plate portions 221 of the lateral members 22, and the through holes 202 are configured to penetrate the lateral plate portion 221 of one of the lateral members 22 and are spaced apart from each other along the length thereof.

The light emitting unit 3 includes a circuit board 31 fixed to the base plate 21, and at least one light source 32 fixed to the circuit board 31. The circuit board 31 is disposed in the receiving groove 211, and the light source 32 may be a light-emitting diode (LED), a cold-cathode tube, a traditional light bulb, or different types of light sources. In this embodiment, the light emitting unit 3 includes a plurality of the light sources 32 that are arranged along the length of the circuit board 31. When a plurality of the light sources 32 are set up on the circuit board 31, the interval between every two light sources 32 is fixed so that a goal of well-distributed light emission may be achieved.

The mounting seat 4 is made of a light reflective material or coated with reflective material on an inner surface thereof, and includes a base plate 41 abutting against the circuit board 31, and two spaced-apart extending plates 42 extending transversely from two opposite sides of the base plate 41 along the same direction and cooperating with the base plate 41 to define the receiving space 40. The base plate 41 is provided with at least one through slot 411 for insertion of the light source 32 thereinto. The through slot 411 communicates with the receiving space 40. In this embodiment, there is a plurality of through slots 411 to accommodate the plurality of the light sources 32. Each extending plate 42 has a plurality of spaced-apart mounting holes 402 respectively aligned with the mounting holes 402 of the other extending plate 42 to form pairs of the mounting holes 402 in the mounting seat 4. Each pair of the aligned mounting holes 402 corresponds in position to a respective one of the through holes 202 in the heat dissipating seat 2.

The mounting seat 4 has two second engaging portions 401 respectively formed on the extending plates 42. The second engaging portions 401 extend oppositely away from the receiving space 40, and are respectively engaged to the first engaging portions 201. In this embodiment, each of the first engaging portions 201 is an engaging groove formed in and extending along the length of the respective lateral plate portion 221, and each of the second engaging portions 401 is an engaging protrusion projecting from and extending along the length of the respective extending plate 42 for engagement with the respective engaging groove or first engaging portion 201. It should be noted herein that the configurations of the first and second engaging portions 201, 401 may be inverted such that the first engaging portions 201 are engaging protrusions, while the second engaging portions 401 are engaging grooves. The coupling method is not limited to what is disclosed herein. As long as the first engaging portions 201 may respectively engage the second engaging portions 401, any coupling method is acceptable.

With reference to FIGS. 3 and 4, to assemble the lamp device of the first embodiment, the circuit board 31 of the light emitting unit 3 is first fixed into the receiving groove 211 of the heat dissipating seat 2, after which the mounting seat 4 is pressed into the accommodation space 20 of the heat dissipating seat 2 through the opening 200. At this time, the second engaging portions 401 respectively engage the first engaging portions 201, so that the mounting seat 4 is fixed in the accommodation space 20. It should be noted herein that, as shown in FIG. 4, since many light sources 32 are fixed on the circuit board 31, when the mounting seat 4 is pressed into the accommodation space 20, the through slots 411 in the base plate 41 must respectively register with the light sources 32 to properly adjust the position of the mounting seat 4 and to permit insertion of the light sources 32 into the respective through slots 411. Each through slot 411 may accommodate at least one light source 32, and may be designed in accordance to needs, so that the light sources 32 may be surrounded by the base plate 41. Not only an alignment guide for coupling can be served, but also with a rib-like structure formed between every two adjacent through slots 411, the mounting seat 4 can further secure the light emitting unit 3 and optimize optical density. Once it is confirmed that the mounting seat 4 is correctly disposed in the accommodation space 20 and the light sources 32 are accommodated in the respective through slots 411, a portion of the light guide plate 5 is then inserted into the receiving space 40, and each of the fixing members 61 penetrates the corresponding through hole 202 and a corresponding pair of the aligned mounting holes 402, and penetrates the portion of the light guide plate 5, thereby fixing the portion of the light guide plate 5 in the receiving space 40. The assembly of the lamp device of the first embodiment is thus completed. Through the aforesaid configuration, the assembly of the first embodiment is quick and easy, and does not require using glue or adhesive tape.

Referring back to FIG. 4, after assembly, the light sources 32 of the light emitting unit 3 are respectively disposed in the through slots 411, so that light emitted from the light sources 32 enters the receiving space via the respective through slots 411 and is transmitted to a particular direction for illumination through the light guide plate 5. Since each of the light sources 32 is clamped by two adjacent rib-like structures of the mounting seat 4 which is made of a light reflective material and is surrounded by the base plate 41, light emitted by each light source 32 toward the sides is reflected into the receiving space 40 through the corresponding through slot 411 and is guided by the light guide plate 5, thereby loss of the light emitted from the light sources 32 that heads toward the sides of the mounting seat 4 can be prevented.

In addition, the heat dissipating seat 2 is made of a material having good thermal conductivity and dissipating the heat generated by the light emitting unit 3 to prevent the light emitting unit 3 from being damaged due to high temperature. Because the mounting seat 4 is made of a light reflective material, it can replace the function of the reflecting pieces 141 shown in FIG. 1, and the fillers 152 shown in FIG. 1 are no longer necessary. The effect of simplifying the assembly of the components can be achieved. The light emitted by the light sources 32 is reflected many times in the mounting seat 4 before it is transmitted out of the accommodation space 20 through the light guide plate 5. This can effectively prevent loss of light energy.

Referring to FIGS. 5 to 8, the second embodiment of the lamp device according to the disclosure is shown to be similar to the first embodiment, and differs in that the heat dissipating seat 2 further includes a fixed bent plate 25 connected to one end of one of the lateral members 22' opposite to the base plate 21 for fixing the heat dissipating seat 2 on a support surface (not shown). The mounting seat 4 further includes two spaced-apart engaging members 45 extending from the base plate 41 into the receiving space 40. The engaging members 45 are respectively disposed proximate to two opposite ends of the extending plate 42.

Figure 7:
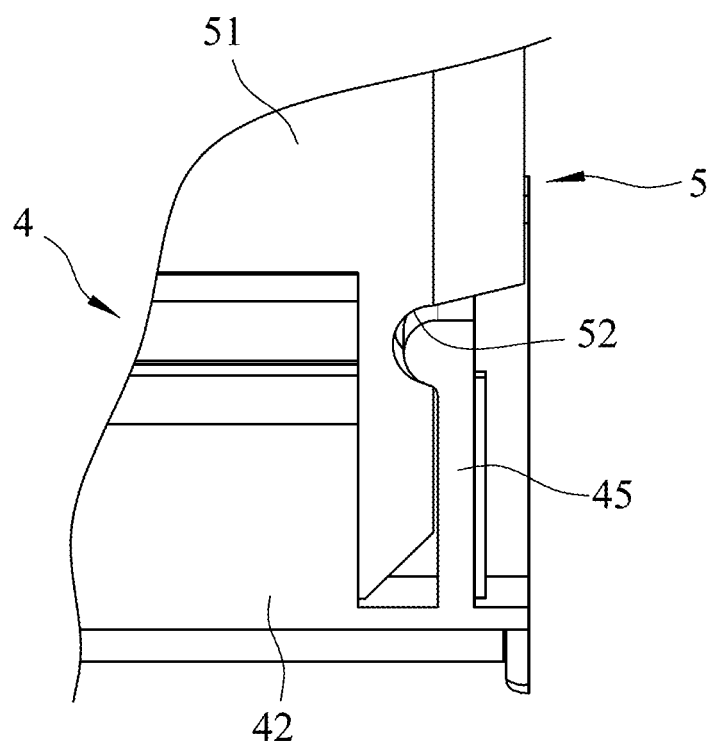
FIG. 7 is another fragmentary schematic side view of the second embodiment taken from a different angle.
Figure 8:
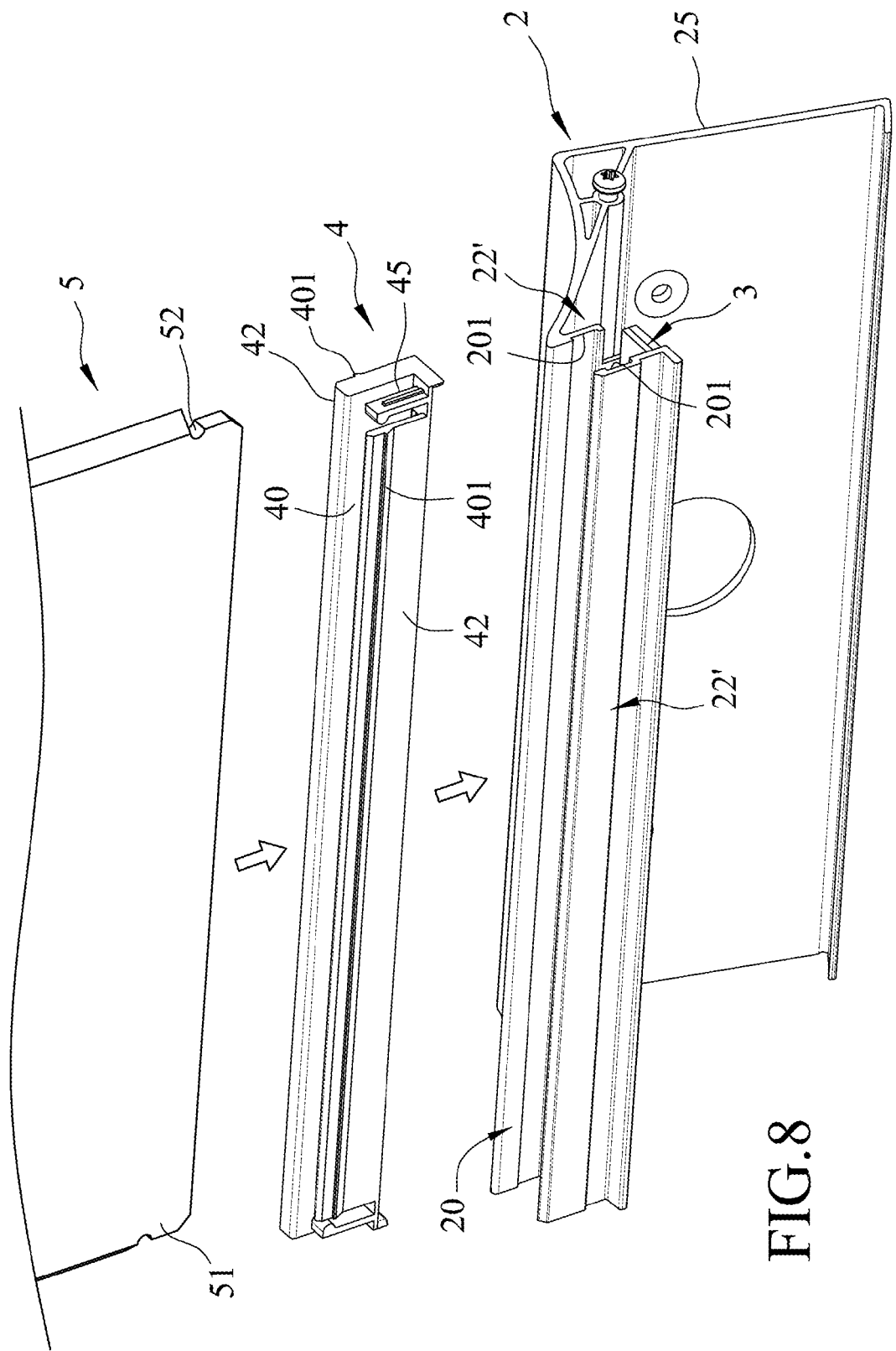
FIG. 8 is a fragmentary and exploded perspective view of the second embodiment, illustrating how a heat dissipating seat, a mounting seat combined with alight emitting unit, and a light guide plate of the second embodiment are assembled.

The assembly process of the lamp device of the second embodiment is similar to that described in the first embodiment. That is, the light emitting unit 3 is received in the receiving groove 211, and the mounting seat 4 is accommodated fixedly in the accommodation space 20 by joining the first and second engaging portions 201, 401. However, as shown in FIGS. 7 and 8, when using the lamp device of the second embodiment, the fixed bent plate 25 is secured to a desired position of the support surface, and the light guide plate 5 is preferably directed upward. Therefore, the fixing of the light guide plate 5 does not require the fixing unit 6 as long as the light guide plate 5 is clamped by the mounting seat 4 to prevent it from falling off from the receiving space 40. In this embodiment, the light guide plate 5 includes a light guide plate body 51, and two engaging notches 52 formed in the light guide plate body for engagement with the engaging members 45, respectively. After the mounting seat 4 is properly accommodated into the accommodation space 20 and secures the light emitting unit 3, the light guide plate 5 is then inserted into the receiving space 40, so that the engaging members 45 respectively engage the engaging notches 52, and thus completing the assembly process of the lamp device of the second embodiment.

Figure 9:
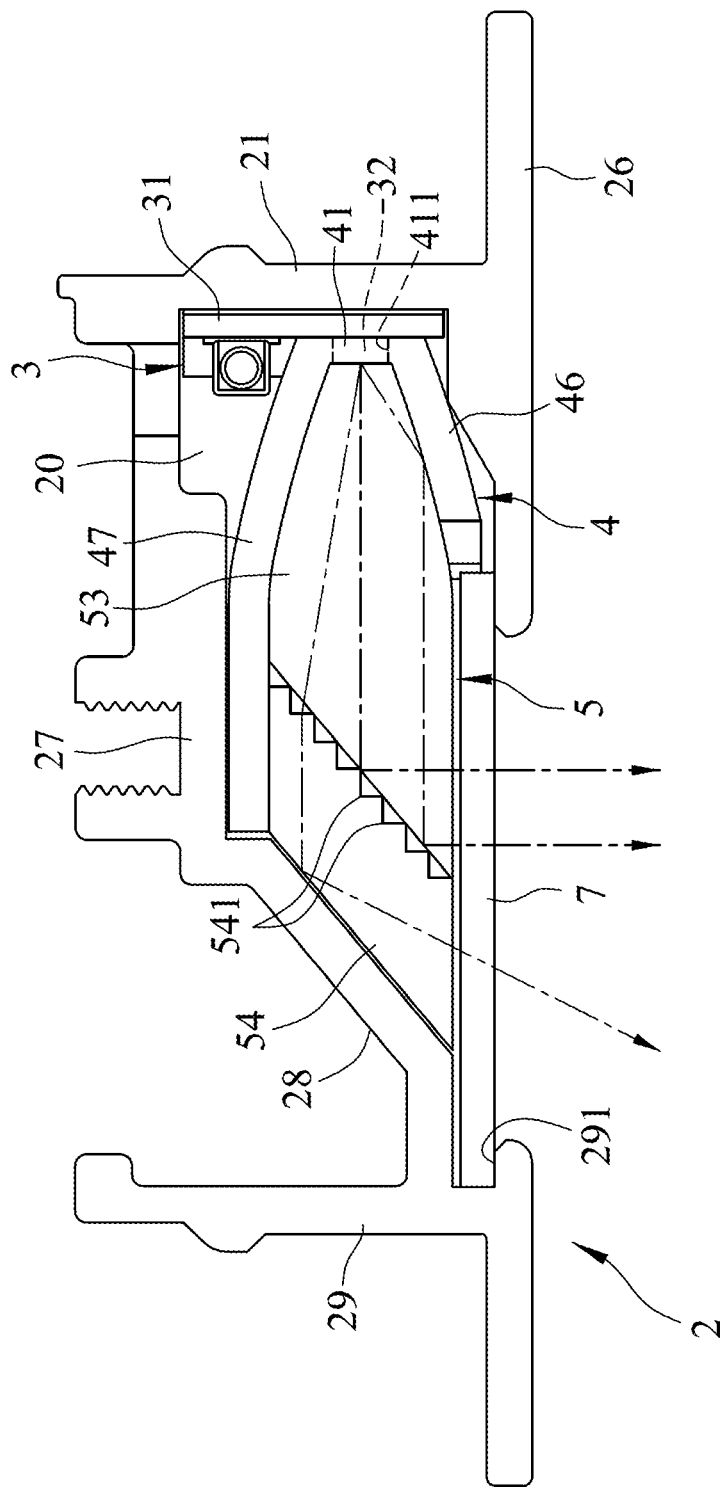
FIG. 9 is a schematic side view, illustrating a third embodiment of the lamp device according to the disclosure.
Figure 10:
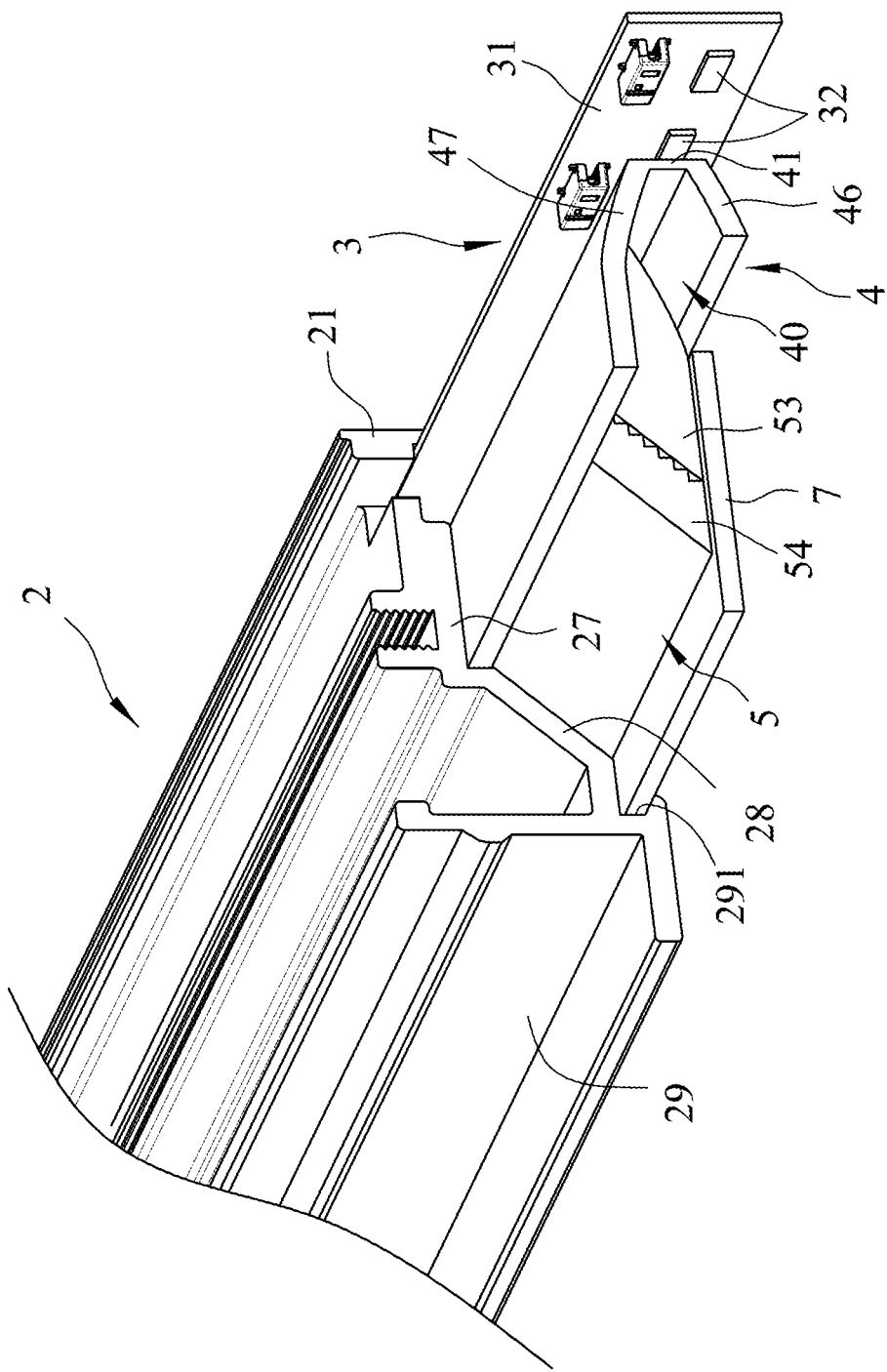
FIG. 10 is a fragmentary assembled perspective view of the third embodiment.

Referring to FIGS. 9 and 10, the third embodiment of the lamp device according to the disclosure is shown to be similar to the first embodiment, and differs in the structure of the heat dissipating seat 2. In this embodiment, the heat dissipating seat 2 includes the base plate 21, a support plate 26 transversely connected to an end of the base plate 21, an abutment plate 27 extending transversely from the base plate 21 opposite to the support plate 26, a folded plate 28 extending obliquely and downward from one end of the abutment plate 27 opposite to the base plate 21 and then extending along a direction parallel to the support plate 26 and away from the base plate 21, and an engaging end plate 29 connected to one end of the folding plate 28 opposite to the abutment plate 27. In this embodiment, the base plate 21, the support plate 26, the abutment plate 27, the folded plate 28 and the engaging end plate 29 cooperatively define the accommodation space 20. The engaging end plate 29 has an engaging groove 291 communicating with the accommodation space 20. The mounting seat 4 includes the base plate 41 abutting against the light emitting unit 3, a first curved plate 46 extending arcuately from one end of the base plate 41 and abutting against the support plate 26, and a second curved plate 47 extending arcuately from the other end of the base plate 41 opposite to the first curved plate 46 and abutting against the abutment plate 27. The base plate 41 and the first and second curved plates 46, 47 cooperatively define the receiving space 40. The first and second curved plates 46, 47 are deformable toward each other.

During assembly of the lamp device of the third embodiment, because the first and second curved plates 46, 47 are deformable and the shape of the mounting seat 4 matches that of the accommodation space 20, the mounting seat 4 can be pushed into the accommodation space 20 and retained therein after the first and second curved plates 46, 47 are restored to their original shape. In addition, the shape of the light guide plate 5 matches the shape of a space surrounded by the mounting seat 4 and the folded plate 28 of the heat dissipating seat 2. The light guide plate 5 includes a light guide main body 53 received in the receiving space 40, and a light guide portion 54 sandwiched between the light guide main body 53 and the folded plate 28. In this embodiment, once the light guide main body 53 and the light guide portion 54 of the light guide plate 5 are stacked one beside the other, the light guide plate 5 can be accommodated in and secured in the space surrounded by the mounting seat 4 and the folded plate 28. Therefore, during assembly of the lamp device of the third embodiment, the fixing of the light guide plate 5 similarly does not require the fixing unit 6 either.

It should be noted that, in order to enhance the luminous efficiency of the lamp device, the third embodiment may further include an optical component 7 having one end engaged to the engaging groove 291 of the engaging end plate 29, and another end supported by the support plate 26 such that the optical component 7 covers the light guide plate 5. The optical component 7 may be a brightness enhancement film. In addition, the light guide portion 54 is formed with a plurality of auxiliary light guide microstructures 541, which in cooperation with the light reflective mounting seat 4, can direct the light emitted by the light sources 32 toward the desired direction for illumination. By reducing loss of light energy, the luminous efficiency of the disclosure can be enhanced. Each of the auxiliary light guide structures 541 may be a microlens having a light concentrating effect or a microprism that can effectively transmit light in the light guide plate 5. As long as the auxiliary light guide structures 541 can effectively assist with guiding light, any structure thereof is acceptable, so that the structures of the auxiliary light guide structures 541 are not limited to what is disclosed herein.

Moreover, if other purposes apart from enhancing the luminous efficiency are required, the optical component 7 in the third embodiment may be a polarizer to polarize the emitted light, a dichroic filter to change the color of the emitted light, or other optical films having the desired effects, and is not limited to what is disclosed herein.

Figure 11:
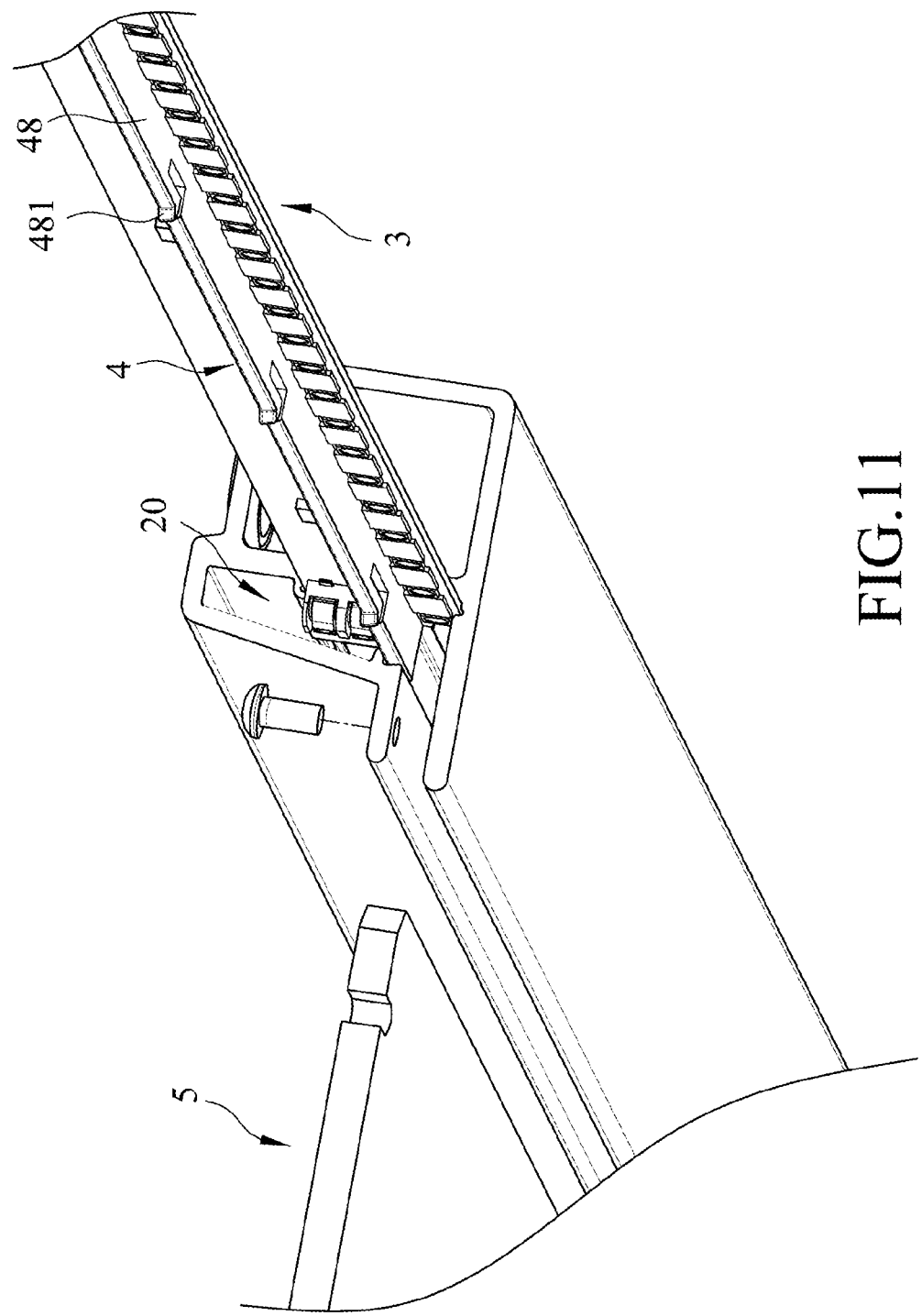
FIG. 11 is a fragmentary perspective view illustrating a fourth embodiment of the lamp device according to the disclosure.
Figure 12:
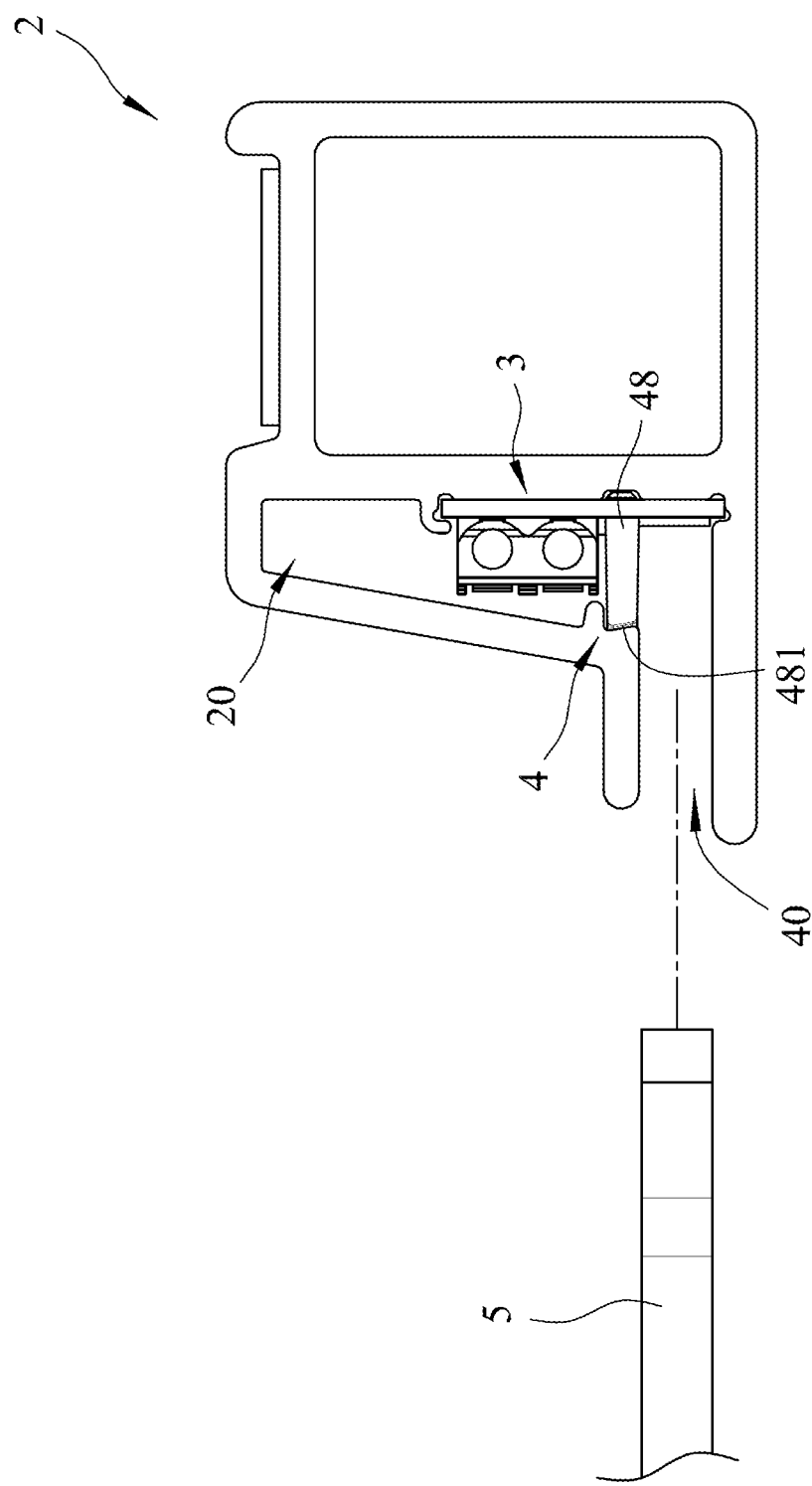
FIG. 12 is a schematic side view of the fourth embodiment.

Referring to FIGS. 11 and 12, the fourth embodiment of the lamp device according to the disclosure is shown to be similar to the first embodiment, and differs in that the mounting seat 4 and the heat dissipating seat 2 cooperatively define the receiving space 40, and the mounting seat 4 includes an extending plate 48, one side of which abuts against the light emitting unit 3. The extending plate 48 and a portion of the heat dissipating seat 2 cooperatively surround and form the receiving space 40 for the light guide plate 5 to extend thereinto and to mount fixedly therein. The extending plate 48 has a plurality of resilient protruding portions 481 which can deform and depend on a restoring force to abut resiliently against the heat dissipating seat 2.

When the extending plate 48 and the light emitting unit 3 are inserted into the accommodation space 20, the resilient protruding portions 481 will deform toward the light emitting unit 3 due to abutment with the heat dissipating seat 2 and respectively store a resilient restoring force for resiliently abutting against the heat dissipating seat 2. Through the restoring forces of the resilient protruding portions 481, the mounting seat 4 and the light emitting unit 3 can be stably positioned in the accommodation space 20. That is, the fourth embodiment can similarly assemble the mounting seat 4 and the light emitting unit 3 in the accommodation space 20 in a simple manner through the resilient restoring forces of the resilient protruding portions 481. Afterwards, the light guide plate 5 can be inserted into the receiving space 40.

From the aforesaid description, it is apparent that the assembly components and process of the present disclosure are simplified. Hence, there is no need to rely on assembly experience and proficiency for quick assembly.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lamp device comprising:
a heat dissipating seat defining an accommodation space with an opening;
a light emitting unit fixed to said heat dissipating seat within said accommodation space;
a mounting seat disposed in said accommodation space and covering said light emitting unit;
a receiving space defined by at least a portion of said mounting seat and extending in a direction away from said light emitting unit; and
a light guide plate having at least a portion inserted into and fixed within said receiving space;
wherein said mounting seat includes a base plate abutting against said light emitting unit, and two spaced-apart extending plates extending transversely from said base plate along the same direction and cooperating with said base plate to define said receiving space;
wherein said mounting seat further includes two spaced-apart engaging members extending from said base plate of said mounting seat;
wherein said light guide plate includes a light guide plate body, and two engaging notches formed in said light guide plate body for engagement with said engaging members, respectively.

2. The lamp device as claimed in claim 1, wherein said mounting seat completely defines said receiving space.

3. The lamp device as claimed in claim 2, wherein said heat dissipating seat has two first engaging portions facing each other and said accommodation space.

4. The lamp device as claimed in claim 3, wherein said mounting seat has two second engaging portions extending oppositely away from said receiving space and respectively engaged to said first engaging portions.

5. The lamp device as claimed in claim 3, wherein said heat dissipating seat includes a base plate, two lateral members respectively connected to said base plate of said heat dissipating seat, and a fixed bent plate connected to one of said lateral members, said lateral members respectively having said first engaging portions.

6. The lamp device as claimed in claim 1, wherein said mounting seat and said heat dissipating seat cooperatively define said receiving space.

7. The lamp device as claimed in the claim 6, wherein said mounting seat includes an extending plate, one side of which abuts against said light emitting unit, said extending plate having at least one resilient protruding portion which can deform and depend on a restoring force to abut resiliently against said heat dissipating seat.

8. The lamp device as claimed in claim 1, wherein said heat dissipating seat includes a base plate, and two lateral members respectively connected to said base plate of said heat dissipating seat.

9. The lamp device as claimed in claim 8, wherein each of said lateral members includes a lateral plate portion connected to said base plate of said heat dissipating seat, and a wing plate portion extending transversely from said lateral plate portion of said heat dissipating seat in a direction away from said light guide plate.

10. The lamp device as claimed in the claim 8, wherein said base plate of said heat dissipating seat is provided with a receiving groove for receiving said light emitting unit.

11. The lamp device as claimed in claim 1, further comprising a fixing unit which includes a plurality of fixing members for fixing said light guide plate.

12. The lamp device as claimed in claim 11, wherein said heat dissipating seat has a plurality of spaced-apart through holes, said mounting seat having a plurality of spaced-apart pairs of mounting holes, each pair of which corresponds in position to a respective one of said through holes, each of said fixing members passing through one of said through holes and a corresponding pair of said mounting holes and penetrating said light guide plate.

13. The lamp device as claimed in claim 1, wherein said engaging members are respectively disposed proximate to two opposite ends of one of said extending plates.

14. The lamp device as claimed in claim 1, wherein said heat dissipating seat includes a base plate, a support plate connected to said base plate, an abutment plate extending from said base plate opposite to said support plate, a folded plate extending obliquely from said abutment plate opposite to said base plate and then extending along a direction parallel to said support plate, and an engaging end plate connected to said folded plate opposite to said abutment plate.

15. The lamp device as claimed in claim 14, wherein said engaging end plate has an engaging groove.

16. The lamp device as claimed in claim 15, further comprising an optical component engaged to said engaging groove of said engaging end plate and covering said light guide plate.

17. The lamp device as claimed in claim 14, wherein said mounting seat includes a base plate abutting against said light emitting unit, a first curved plate extending arcuately from said base plate of said mounting seat and abutting against said support plate, and a second curved plate extending arcuately from said base plate of said mounting seat opposite to said first curved plate and abutting against said abutment plate, said first and second curved plates being deformable toward each other.

18. The lamp device as claimed in claim 14, wherein said light guide plate includes a light guide main body received in said receiving space, and a light guide portion sandwiched between said light guide main body and said folded plate.

19. The lamp device as claimed in the claim 1, wherein said light emitting unit includes a circuit board fixed to said heat dissipating seat, and at least one light source fixed to said circuit board.

20. The lamp device as claimed in claim 19, wherein said base plate of said mounting seat is provided with at least one through slot for insertion of said at least one light source thereinto.

21. The lamp device as claimed in claim 1, wherein said mounting seat is made of a light reflective material or coated with reflective material on an inner surface thereof.

22. A lamp device comprising:
a mounting seat including a base plate, and two spaced-apart extending plates extending from said base plate along the same direction and cooperating with said base plate to define a receiving space, said base plate having at least one through slot;
a light guide plate having at least a portion inserted into and fixed within said receiving space; and
a light emitting unit including at least one light source, wherein light emitted from said at least one light source enters said receiving space through said at least one through slot and emits out through said light guide plate;
wherein said mounting seat further includes two spaced-apart engaging members extending from said base plate of said mounting seat;
wherein said light guide plate includes a light guide plate body, and two engaging notches formed in said light guide plate body for engagement with said engaging members, respectively.

23. The lamp device as claimed in claim 22, wherein said at least one light source of said light emitting unit is outside of said receiving space of said mounting seat.

* * * * *